United States Patent [19]

Schumann et al.

[11] Patent Number: 4,895,891

[45] Date of Patent: Jan. 23, 1990

[54] MAT, ELASTIC-THERMOPLASTIC MOLDING COMPOUNDS

[75] Inventors: Werner Schumann, Pulheim; Werner Tischer; Wolfgang Liedtke, both of Dormagen; Klaus Richter, Cologne, all of Fed. Rep. of Germany

[73] Assignee: Bayer Aktiengesellschaft, Leverkusen-Bayerwerk, Fed. Rep. of Germany

[21] Appl. No.: 202,369

[22] Filed: Jun. 6, 1988

[30] Foreign Application Priority Data

Jun. 17, 1987 [DE] Fed. Rep. of Germany ....... 3720210

[51] Int. Cl.$^4$ ............................ C08K 3/36; C08J 5/18; C08L 51/04; C08L 9/02
[52] U.S. Cl. .................................... 524/493; 524/504
[58] Field of Search ................................ 524/493, 504

[56] References Cited

U.S. PATENT DOCUMENTS

| | | | |
|---|---|---|---|
| 3,907,734 | 9/1975 | Broeck et al. | 524/493 |
| 4,278,587 | 7/1981 | Wolff et al. | 524/493 |
| 4,692,479 | 9/1987 | Schneider et al. | 524/493 |
| 4,710,536 | 12/1987 | Klingen et al. | 428/308.8 |

FOREIGN PATENT DOCUMENTS

| | | | |
|---|---|---|---|
| 0195273 | 9/1986 | European Pat. Off. | 524/493 |
| 0101173 | 6/1983 | Japan | 524/493 |

*Primary Examiner*—Herbert J. Lilling
*Attorney, Agent, or Firm*—Connolly and Hutz

[57] ABSTRACT

Elastic-thermoplastic molding compounds containing at least one graft polymer of resin forming monomers on a rubber and optionally other thermoplastic resins containing from 0.1 to 5% by weight, based on the molding compound, of a hydrophobicized silica and the use of these molding compounds for the production of sheets and coatings with a uniformly mat surface.

6 Claims, No Drawings

MAT, ELASTIC-THERMOPLASTIC MOLDING COMPOUNDS

This invention relates to elastic-thermoplastic moulding compounds containing at least one graft polymer of resin forming monomers on a rubber and optionally other thermoplastic resins which contain from 0.1 to 5% by weight, based on the moulding compound, of a hydrophobicised silica, preferably from 0.2 to 2.0% by weight.

The invention further relates to the use of these moulding compounds for the production of moulded products, in particular sheets and coatings, which have a uniformly mat surface and substantially unimpaired mechanical properties.

The starting materials for the moulding compounds according to the invention are mainly graft polymers of resin forming monomers on at least partially cross-linked rubbers which may constitute diene rubbers such as polybutadiene, polyisoprene or butadiene/styrene copolymers, acrylate rubbers such as poly-n-butyl acrylate or EPDM rubbers (of ethylene, propylene and a non-conjugated diene). These rubbers are also referred to as the graft basis.

Resin forming monomers, hereinafter also referred to as the graft monomers, are preferably styrene, styrenes substituted in the nucleus or side chain, acrylonitrile, methyl methacrylate or mixtures thereof. A mixture of styrene (50 to 90% by weight) and acrylonitrile (50 to 10% by weight) is preferred. The graft copolymers generally contain from 10 to 80% by weight of rubber, preferably from 10 to 50% by weight. These graft polymers are known and methods for their preparation are state of the start. Such graft polymers are generally obtained by the polymerization of monomers in the presence of rubber with the aid of radical initiators. The graft polymerisation is generally not complete. Free copolymers of the graft monomers are formed in addition to the "graft branches" which are chemically bound to the rubber. The product obtained is therefore generally a mixture of the graft polymer proper and free copolymer. Additional copolymer is in many cases added to influence the properties of the material.

All these products will hereinafter be referred to as ABS plastics. This term is normally used for acrylonitrile-butadiene-styrene plastics but in the present context is also used to include similar materials, i.e. graft polymers with rubbers other than polybutadiene as graft basis and graft monomers other than styrene and acrylonitrile as well as mixtures of such graft polymers with free copolymers of the graft monomers.

ABS platics may be used as the only starting material for the invention but they may also be mixed with other thermoplastic resins, e.g. aromatic polycarbonates, polyamides, polymethyl methacrylates, polyvinyl chloride or ethylene/vinyl acetate copolymers, but the ABS plastic must constitute at least 50% by weight of the mixture.

The properties may be even further improved by the addition of a nitrile rubber, i.e. a copolymer of acrylonitrile and butadiene, in a quantity of 5 to 50% by weight, preferably from 10 to 20% by weight to the starting materials for the moulding compounds.

The hydrophobicised silicas present in the moulding compounds according to the invention are known per se. They may be prepared, for example, by mixing sulphuric acid and sodium silicate and processing the resulting hydrogel (by washing, drying, grinding and sizing). The silicas are rendered hydrophobic by adding particular waxes, inter alia polyethylene waxes or polypropylene waxes, and incorporating them while grinding.

To prepare the moulding compounds, the hydrophobicised silicas can be incorporated into ABS plastics or mixtures thereof with other thermoplasts via the molten state. In the simplest case, the mixing apparatus used is a screw extruder or internal kneader which is charged with the synthetic resins and the hydrophobicised silicas and from which the moulding compound is obtained in the form of a strand which can be granulated.

The usual additives such as stabilizers, colouring pigments and antistatic agents may, of course, be added to the moulding compounds.

Moulded products of any type may be produced from the moulding compounds according to the invention by thermoplastic shaping. Suitable shaping processes are, for example, injection moulding, extrusion and deep drawing. The moulded products in all cases have a completely uniform, mat surface of outstanding quality. The properties of the moulded products are, of course, also determined by the properties of the synthetic resin material from which they are produced, and the mechanical properties of the starting material are virtually unchanged in spite of the addition of matting agent. The moulding compounds are particularly suitable for the production of sheets or films by casting, extrusion an blow moulding. The sheets also have completely uniform, mat surfaces. Moulded products without additives have a degree of gloss of 85 to 95%, determined with a multigloss degree measuring apparatus of Byk at a measuring angle of 60° (calibrated according to DIN 67530). The degree of gloss is defined as the proportion of light reflected from the surface of the sample (max 100%). Moulded articles which contain matting additive have gloss degrees of 5 to 40%, depending on the processes employed.

In one particular embodiment, thin films are produced by film casting. This requires the use of certain mould release agents. Inspite of their very small thickness (5 to 100 μm), the monofilms obtained can be detached from the supporting substrates.

Parts in the following examples are by weight.

Example of Practical Application

| 1. Formulation |
| --- |
| 60 Then are mixed to produce a moulding compound: parts of acrylonitrile-butadiene-styrene ter-polymer an acrylonitrile-butadiene-copolymer in a weight ratio of 80:20 |
| 40 parts of acrylonitrile-styrene copolymer |
| 2.0 parts of pentaerythritol tetrastearate (PETS) |
| 0.5 parts of magnesium stearate |
| 0.2 parts of silicone oil |
| 0.5 parts of hydrophobicised silica |
| 1.0 parts of carbon black (color pigment). |

Homogenisation of the moulding compound

A Banbury internal kneader is used which comprises essentially (a) a pneumatically controlled plunger cylinder which forces the material to be mixed into the chamber and keeps it in the chamber during the mixing process, (b) a feed hopper; the entire mixture is forced through the open valve, (c) mixing chamber; the jackets of the chamber are equipped for water, steam or other heating means, (d) two rotors for the mixing process and (e) a flap saddle for ejecting the melt.

The starting material is introduced into the internal kneader through the feed hopper and the plunger cylinder is lowered (plunger pressure 2.5 bar). The powder-form starting material is molten after 1 to 2 minutes. Pressure is applied and released on the plunger cylinder three times at intervals of one minute (melting temperature about 180° C.). The homogenised melt is then discharged and processed on a rubber mill to form a band which is subsequently granulated.

3. Shaping of the moulding compound

The above compounded moulding compound is processed (a) by extrusion in a single shaft extruder to form highly mat films and sheets from 100 to 1000 μm in thickness (degree of gloss: 5 to 10%);

(b) in an injection moulding machine (maker: Arburg) to produce moulded products (degree of gloss: 30 to 40%).

The mechanical properties of the mat injection moulded products are:

Notched impact strength according to DIN 53453: ak) 20 kJ/m$^2$;

Impact strength according to DIN 53453: an $-40°$ C.) 75 kJ/m$^2$;

Ball indentation hardness according to DIN 53456: hk$>$60 N/mm$^2$;

Softening temperature according to DIN 53460: vicat B$>$95° C.;

Melt viscosity according to DIN 53735: MVI$>$3 g/10 min.

(c) By dissolving in methylene chloride and casting films from the solution in a drum casting machine or a band casting machine or a band casting machine to form a highly mat film 5 to 10 μm in thickness.

Band casting machine and drum casting machine (degree of gloss: 15 to 20%).

The casting solution is prepared as follows:

4 parts of hydrophobicised silica in 375 g of $CH_2Cl_2$ are introduced into a 500 ml stirrer vessel and stirred for 2 hours. 125 g of powder of the above formulation or compounded moulding compound are then introduced and stirring is continued for 2 hours at room temperature. 5 ml of hexyldecyl phosphate (mould release agent) are then added and stirring is continued for 30 minutes.

We claim:

1. An elastic-thermoplastic molding coposition which is an ABS or similar material including graft polymers with rubbers other than polybutadiene as graft basis and graft monomers other than styrene and acrylonitrile as well as mixtures of such graft polymers with free copolymers of the graft monomers, which comprises one or more polymers of resin-forming monomers grafted on rubbers and optionally one or more other thermoplastic synthetic resins and from 0.1 to 5%, by weight, based on the composition, of a hydrophobicized silica.

2. A composition as claimed in claim 1 wherein from 0.2 to 2.0%, by weight, of hydrophobicised silica is present.

3. A composition as claimed in claim 1 wherein a nitrile rubber is also present.

4. A composition as claimed in claim 3 wherein from 5 to 50%, by weight, of nitrile rubber is present.

5. A method of making shaped articles, in particular films, having a uniformly mat surface and nearly unimpaired proportion which comprises thermoplastically shaping the moulding composition of claim 1.

6. A composition as claimed in claim 2 wherein a nitrile rubber is also present.

* * * * *